United States Patent [19]

Yamasaki

[11] Patent Number: 4,677,703
[45] Date of Patent: Jul. 7, 1987

[54] DIES FOR FORMING DRILLING SCREWS

[75] Inventor: Katsuhisa Yamasaki, Hatano, Japan

[73] Assignee: Topura Co., Ltd., Osaka, Japan

[21] Appl. No.: 837,295

[22] Filed: Mar. 7, 1986

Related U.S. Application Data

[63] Continuation of Ser. No. 667,055, Oct. 31, 1984, Pat. No. 4,586,862, which is a continuation of Ser. No. 337,278, Jan. 5, 1982, abandoned.

[30] Foreign Application Priority Data

Jan. 12, 1981 [JP] Japan .................................. 56-2830

[51] Int. Cl.$^4$ .......................... B21K 1/44; B23G 9/00
[52] U.S. Cl. .............................................. 10/9; 10/24
[58] Field of Search ............................. 10/4, 9, 21, 24; 72/360, 470, 476; 408/223–230; 411/386, 387

[56] References Cited

U.S. PATENT DOCUMENTS

| | | | |
|---|---|---|---|
| 3,207,024 | 9/1965 | Sommer | 10/9 X |
| 3,395,603 | 7/1968 | Skierski | 411/387 |
| 3,398,413 | 8/1968 | Skierski | 10/21 X |
| 3,463,045 | 8/1969 | Prescott | 411/387 |
| 3,517,581 | 6/1970 | Stokes et al. | 411/387 |
| 3,710,676 | 1/1973 | Ringland | 411/387 |
| 3,779,664 | 12/1973 | Caley et al. | 408/230 X |
| 4,125,050 | 11/1978 | Schwartzman et al. | 411/387 |
| 4,222,689 | 9/1980 | Fujiwara | 411/387 |
| 4,407,620 | 10/1983 | Shinjo | 411/387 |

FOREIGN PATENT DOCUMENTS

| | | | |
|---|---|---|---|
| 2751407 | 5/1978 | Fed. Rep. of Germany | 10/21 |
| 7707804 | 10/1977 | Netherlands | 411/387 |
| 1316157 | 5/1973 | United Kingdom | 411/387 |

*Primary Examiner*—E. Michael Combs
*Attorney, Agent, or Firm*—Holman & Stern

[57] ABSTRACT

Dies for manufacturing drilling screws and drill sections thereof comprise respectively a cavity formed by all flat faces, two straight longitudinal parallel side edges and two straight oblique front edges formed at the same height as the side edges on the top portion, a top flat elongate face adjacent to the cavity and between one of the side edges and the cavity, inclined faces adjacent to all said edges, and a top flat base face positioned on the same height as the top elongate face and the parallel side edges. The two parallel side edges form cutting edges on flat vertical walls of the drill section of the screw, and the cavities form protruding blocks formed respectively by three flat inclined faces and a relief face. A method of manufacturing a drill section of a drilling screw comprises providing a pair of dies having cavities formed by all flat faces, and being symmetrical, positioning a workpiece between the pair of dies, and closing the pair of dies to form a drill section of a drilling screw therebetween.

5 Claims, 13 Drawing Figures

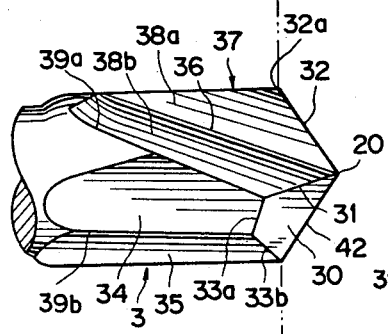
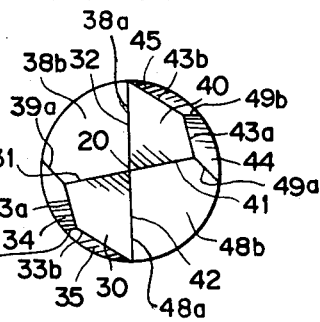
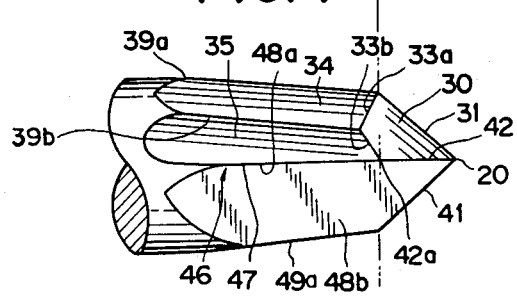
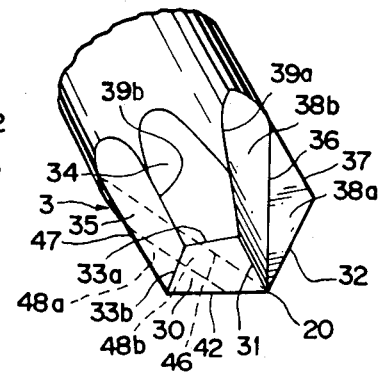
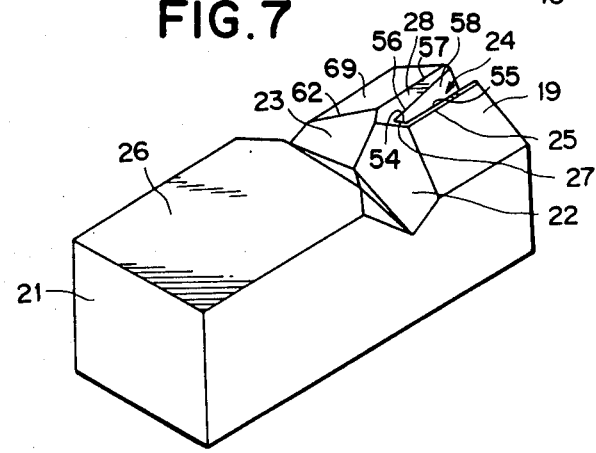

DIES FOR FORMING DRILLING SCREWS

This is a continuation of application Ser. No. 667,055 filed Oct. 31, 1984, now U. S. Pat. No. 4,586,862, which in turn is a continuation of application Ser. No. 337,278, filed on Jan. 5, 1982, now abandoned.

BACKGROUND OF THE INVENTION

1. Field of the Invention

This invention relates to dies for making drilling screws to drill and fasten workpieces such as steel plates without requirement for predrilled holes in the workpieces, which may be about 1 mm to about 2 mm in thickness and to a method of manufacturing drilling screws.

2. Description of the Prior Art

Two different types of self-tapping screws are known for fastening workpieces together without requiring predrilling holes therefor in the workpieces. One is a cone point tapping screw, and another is a drilling screw which has drill means at a tip portion. Many screws and methods of producing them are known.

The cone point tapping screw comprises a shank section which extends at the same diameter and has threaded convolutions thereon and has a head at one end, a tapered section with tapered threaded convolutions at another end of the shank, and the tapered section terminates in a sharp tip.

The workpieces are broken through by the sharp tip and the hole produced is enlarged by the tapered section. Then the drilling through the workpieces is made and the workpieces are fastened by the shank section.

In cases where the workpieces are hard and thick, drilling does not occur efficiently on the tapered section. When the workpieces are drilled, the cone point tapping screw does not move forward, but races, and the tapered section is superheated and damaged. Accordingly, the drilling ability of the screw falls conspicuously.

In a conventional screw, there is an improvement wherein the tip angle is reduced less than 40 degrees and has the tapered section of a circular cone shape. In addition, threaded convolutions are formed on the tapered section.

The tapping screw is applied to workpieces of relatively soft materials of thin steel plates which are less than 1 mm in thickness and easy to perforate by the sharp tip portion and immediately insert the threaded shank into the hole. Therefore, the required drilling time is reduced as compared with a drilling screw which drills the workpieces by scraping. Also it is able to take the correct position by the sharp tip and to provide the tapping screw at low cost, since the structure thereof is simpler than drilling screws. However, if the tip is excessively sharpened the tip section is easily broken and it is very difficult to provide the threaded convolutions on the tapered section. Therefore the productivity is decreased.

In another drilling screw, the screw has generally a shank which has the same diameter, a head at one end, and a drill section which extends from the shank and has a chisel point at the tip and cutting edges which are symmetrically formed by cutting sections and relief flutes on the shank and drill section. The drill section of the drilling screw scrapes and simultaneously perforates the workpieces the same as a drill section of a drilling screw. The drilling screw is able to be used on workpieces to obtain equivalent drilling efficiency by perforation without regard to the materials and/or thickness of the workpieces, which is different from the cone point screw.

However, there is great resistance against advancing the chisel point which is provided to reinforce the cutting edge since it is the same as rotation of an obtuse angle wedge. Therefore, the drilling efficiency is decreased, and the tip of the drilling screw easily slips out of the hole as compared with the cone point screw, and productivity of the drilling screw decreases. Also the cost for manufacturing thereof increases for the reason that the complex structure requires curvature processing in order to be similar to the cutting edge of a drill. Under these circumstances, in a case where the materials of the workpieces are soft or the thickness thereof is less than 1 mm even if the materials are hard, it is better to use the low cost cone point screw which takes a shorter time for drilling than the drilling screw. On the other hand, in a case where the workpieces are hard and are more than 2 mm in thickness, it is better to use a drilling screw to obtain equivalent sharpening perforation efficiency.

SUMMARY OF THE INVENTION

An object of the present invention is to provide dies for manufacturing drilling screws and particularly drill sections thereof. The present invention provides novel dies for manufacturing drilling screws to solve the defects of the cone point tapping screw and a conventional drilling screw which has a chisel point. In the steel plate market, steel plates of 1 mm to 2 mm in thickness are generally consumed. The drilling screws made with the dies of the present invention are suitably applied to steel plates which are 1 mm to 2 mm in thickness.

Accordingly, a further object of the present invention is to provide novel dies for manufacturing drilling screws to apply to steel plates of 1 mm to 2 mm in thickness.

Another object of the present invention is to provide novel dies having all flat surfaces for producing drilling screws formed by all flat faces, and do not have any curved faces at a drilling section, and in which the productivity is superior to existing dies.

Still another object of the present invention is to provide novel dies for manufacturing drilling screws which do not have a chisel point that increases resistance against advancing, and in which the scraping efficiency is excellent.

A further object of the present invention is to provide novel dies for manufacturing a drilling screw which has a thick drilling section and is strengthened thereby against breakage of the tip thereof.

BRIEF DESCRIPTION OF THE DRAWINGS

FIG. 3 is a partial diagrammatic front view of a drill section of the drilling screw of FIG. 1;

FIG. 4 is a side view of the drill section of FIG. 3 rotated by 90 degrees;

FIG. 5 is an end elevational view of the drill section of FIG. 3;

3

Figure 8:
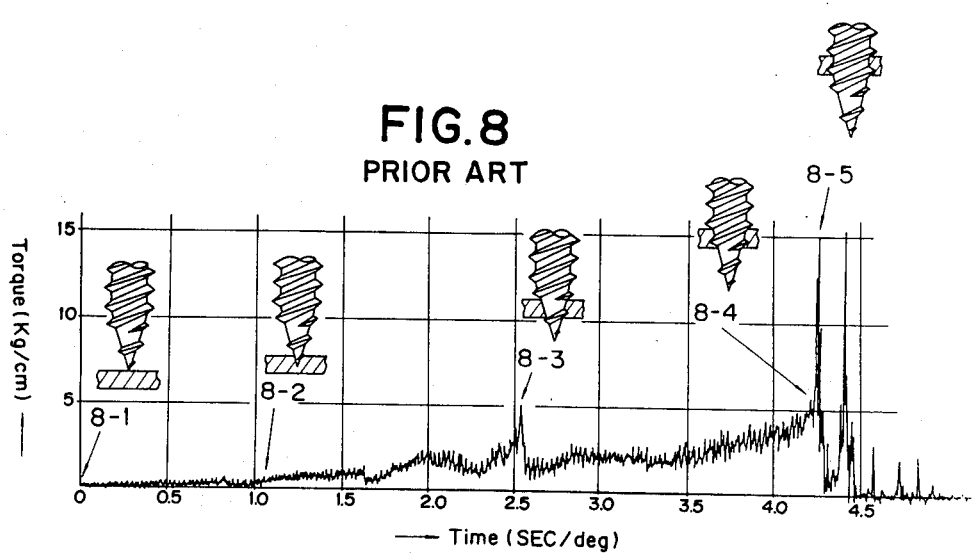
Figure 9:
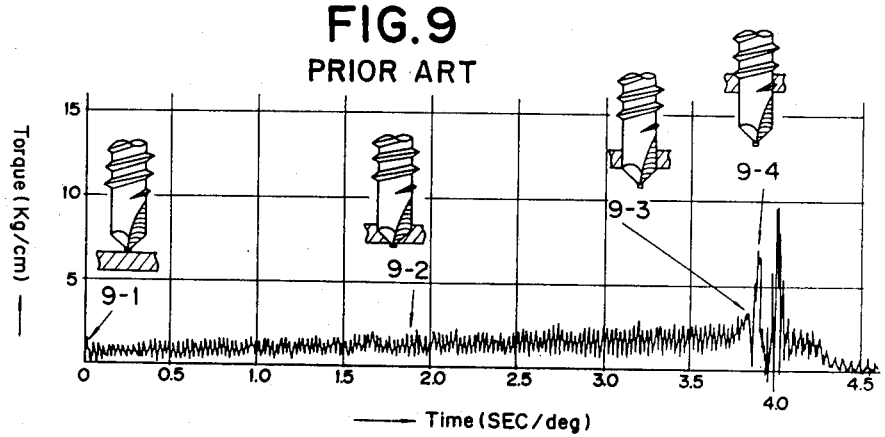
Figure 10:
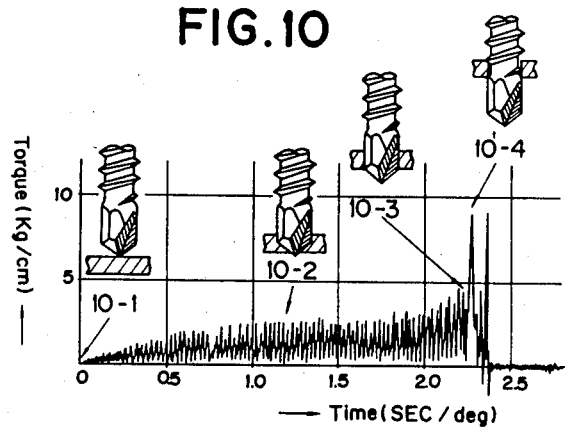
Figure 11:
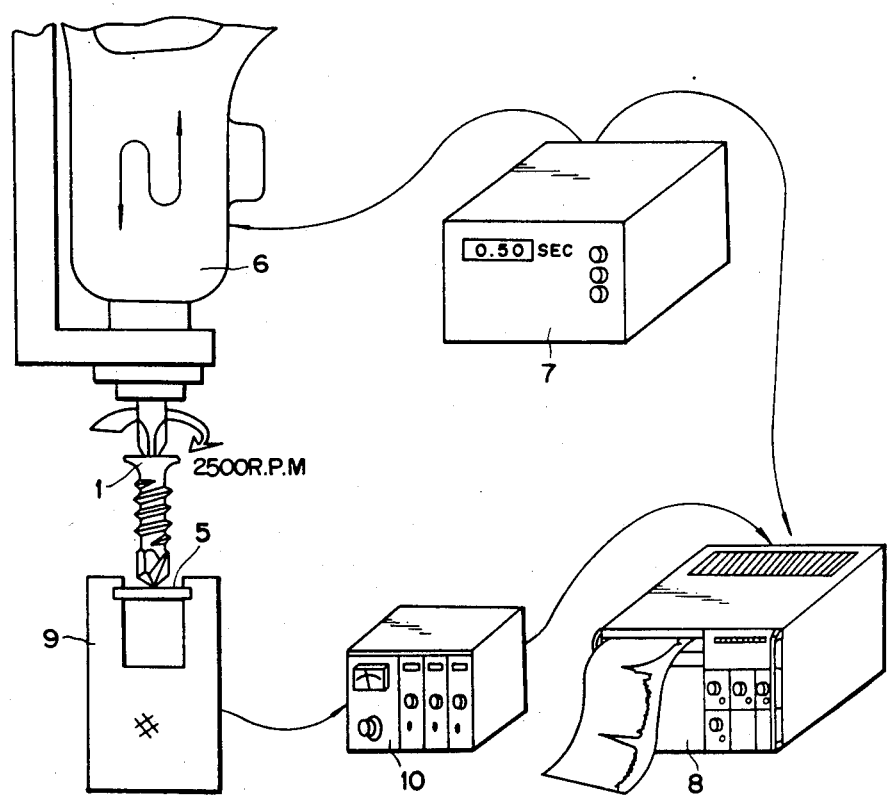
Figure 12:
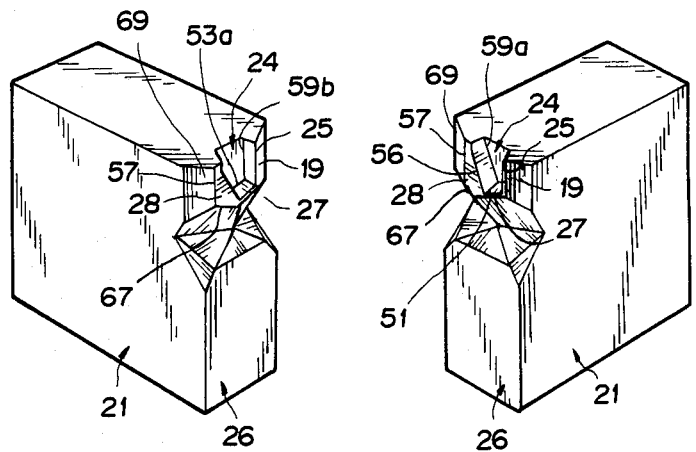
Figure 13:
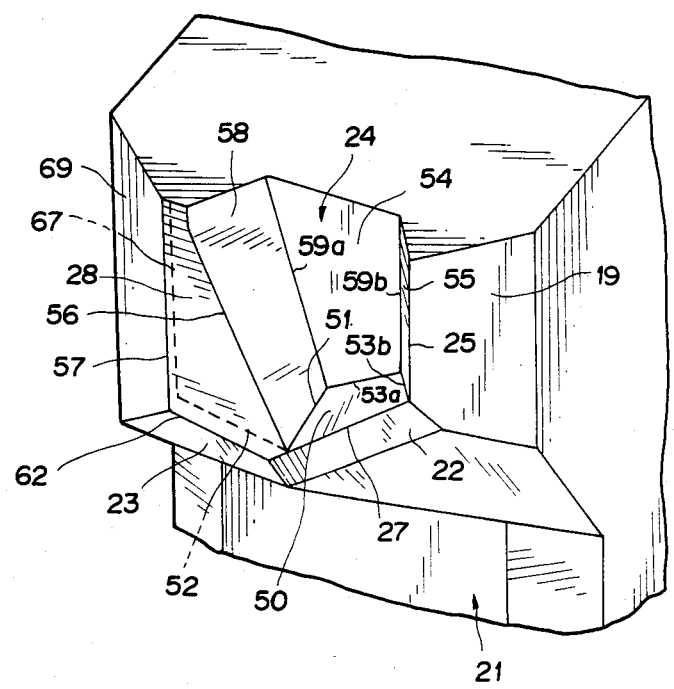

FIG. 6 is a perspective view of the drill section of FIG. 3;

FIG. 7 is a perspective view of a die of the invention for processing the drill section;

FIG. 8 is a graphical representation showing perforation efficiency of a conventional cone point tapping screw;

FIG. 9 is a graphical representation showing drilling efficiency of a conventional drilling screw;

FIG. 10 is a graphical representation showing drilling efficiency of a drilling screw manufactured by the novel dies of the present invention;

FIG. 11 is a schematic flow diagram showing apparatus for measurement of the drilling efficiency shown in FIGS. 8, 9 and 10;

FIG. 12 is a perspective view of a pair of identical dies of the invention for processing the drill section; and FIG. 13 is an enlarged perspective partial view of the die shown in FIGS. 7 and 12.

DETAILED DESCRIPTION OF THE INVENTION

Figure 1:
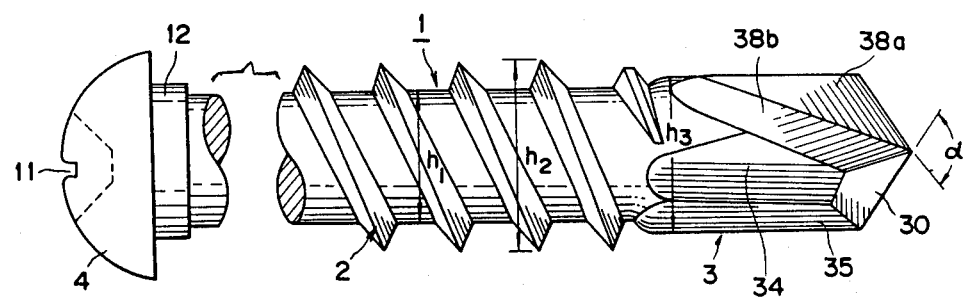
FIG. 1 is a front elevational view showing a drilling screw manufactured by the dies of the present invention.
Figure 2:
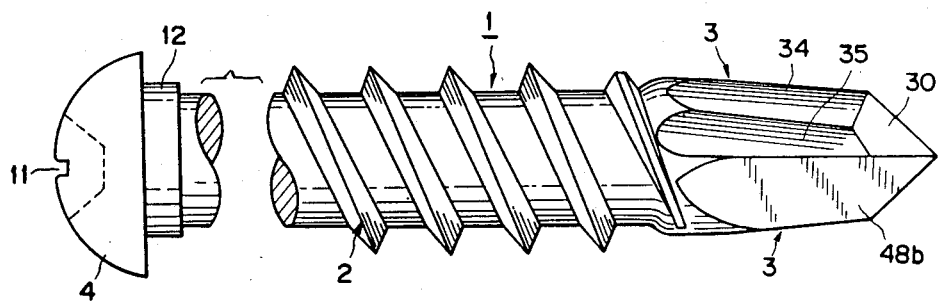
FIG. 2 is a side elevational view of the drilling screw of FIG. 1 rotated by 90 degrees.

Referring to the drawings, a preferred embodiment of the present invention is shown in FIGS. 7, 12 and 13. FIG. 1 and FIG. 2 show a drilling screw 1 made with the dies of the present invention which has a threaded convolution 2 provided on a shank, a drill section 3 which extends from the shank, and a head 4 at the other end of the shank. The shank has a base 12 at the end thereof. The shank has a predetermined diameter $h_1$, the threaded convolution has a diameter $h_2$, and the drill section has a diameter $h_3$ as shown in FIG. 1. The diameter $h_3$ of the drill section is larger than the diameter $h_1$ of the shank but is smaller than the diameter $h_2$ of the threaded convolutions.

In FIGS. 3 to 6, the drill section of the screw of FIGS. 1 and 2, is shown.

The drill section 3 has a tip 20 which does not form a chisel point. A pair of relief faces 30 and 40 are provided as end flat surfaces on opposite sides of the axis of the shank and drill section. The relief faces 30 and 40 are symmetrical, non-equilateral flat surfaces respectively surrounded by first ridge lines 31 and 41, second ridge lines 33a and 43a, third ridge lines 33b and 43b, and inclined edges 32 and 42.

The drill section 3 has the pair of inclined edges 32 and 42 extending from the tip 20, and has a pair of parallel edges 37 and 47 which are parallel with the axis of the drill section at the periphery in the longitudinal direction. The relief faces 30 and 40 are provided at the rear side of the inclined edge portions. From both the parallel and inclined edges, respectively, axially extending flat walls extend at the front sides of these edges. The axially extending walls are shown by the numerals 38a and 48a.

Inclined flat faces 35 and 45 are provided at the rear side of the axially extending walls 38a and 48a inclined from the parallel edges. The longitudinally inclined faces 35 and 45 are adjacent to the relief faces 30 and 40 at one end respectively.

V-shaped flutes 36 and 46 are provided between the axially extending walls 38a and 48a and other inclined flat faces 38b and 48b which are adjacent to the vertical walls. Between the inclined flat faces 35, 45, the inclined flat faces 38b, 48b and the relief faces 30, 40, inclined flat faces 34, 44 are respectively provided.

Each protruding block, which is approximately a trapezoidal block portion, is respectively provided at rear sides of the vertical walls. The protruding blocks are surrounded by the faces 30, 34, 35 and 38b protruding from the rear of the vertical wall 48a, and by faces 40, 44, 45 and 48b protruding from the rear of the vertical wall 38a.

Both the first ridge lines 31 and 41 are in a straight line in a top plan view, and both the inclined edges 32 and 42 are also in a straight line in a top plan view, and both the straight lines are formed to make diagonal lines respectively. The first ridge lines 31 and 41 are positioned at the forward direction of rotation of the drill screw for fastening. The inclined edges 32 and 42 are extended to the end of each parallel edge 37 and 47 having the diameter $h_3$.

The parallel edges 37 and 47, and inclined edges 32 and 42 are reinforced by the protruding blocks formed by the first inclined flat surfaces 38b and 48b, the second inclined flat surfaces 34 and 44, and the third inclined flat surfaces 35 and 45, and the relief faces 30 and 40.

The parallel edges and the inclined edges are formed as cutting edges respectively.

An end of the first ridge lines 31 and 41 is adjacent to the bottom line of the V-shaped flutes 36 and 46 at the tip portion 20, and the other ends of the first ridge lines 31 and 41 are respectively adjacent to inclined top lines 39a and 49a.

The first inclined flat surfaces 38b and 48b are surrounded by the bottom lines of the V-shaped flutes 36 and 46, the first ridge lines 31 and 41, and the first inclined top lines 39a and 49a. The second inclined flat surfaces 34 and 44 are surrounded by the first inclined top lines 39a and 49a, the second ridge lines 33a and 43a, and the second inclined top lines 39b and 49b. And, the third inclined flat surfaces 35 and 45 as relief faces are surrounded by the parallel edges 37 and 47, the third ridge lines 33b and 43b, and the second inclined top lines 39b and 49b.

The inclined edges 32 and 42 form the preferable tip angle $\alpha$ at the tip portion 20, and the drill section 3 of the screw is formed by all the flat faces, not including any curved faces.

Referring to FIGS. 7, 12 and 13 the die 21 has three inclined surfaces 19, 22 and 23, a groove, or cavity, 24 in which part of the drill section end of the shank is formed, a flat surface 26 which contacts with an identical surface of another die, and two inclined edges 25 and 27 and a flat surface 28 by which the substantial drill section is formed.

FIG. 12 shows in perspective a pair of the identical dies 21, and FIG. 13 shows an enlarged perspective partial view of the die.

The cavity 24 is formed by a first flat inclined tapering inside wall 58, a second flat inclined inside wall 55, a third flat inclined front inner wall 50 and a flat inclined tapering bottom 54.

A first top flat elongate face 28 is surrounded by an upper edge 56 of the first inclined tapering inside wall 58, a second longitudinal straight inclined side edge 57 which is parallel to the first longitudinal straight inclined side edge 25, a second straight oblique inclined front edge 62 which is adjacent to the first straight oblique inclined front edge 27 and joins edge 27 at a front point, and a partial edge of the oblique front edge 27. A side inclined face 69 is adjacent to and includes the second longitudinal straight inclined side edge 57, and is inclined in a direction opposite to that of the side inclined face 19.

When the pair of the dies 21 engage each other, the first longitudinal straight inclined side edge 25 and the first straight oblique inclined front edge 27 of one die engage the first top flat elongate face 28 on the inside of the second longitudinal straight inclined side edge 57 and the second straight oblique inclined front edge 62, respectively, of the other die, i.e., the first longitudinal straight inclined side edge 25 and the first straight oblique inclined front edge 27 of one die engage respectively on phantom lines 67 and 52 of the other die shown in FIG. 13.

A V-shape flute line 51 between the third flat inclined front inner wall 50 and the first flat inclined tapering inside wall 58 corresponds to and forms the first ridge line 31 or 41 of the drill section 3 of the drilling screw 1.

A V-shape flute line 53a between the third flat inclined front inner wall 50 and a flat inclined tapering bottom 54 corresponds to and forms the second ridge line 33a or 43a of the drill section 3.

A V-shape flute line 53b between the third flat inclined front inner wall 50 and the second flat inclined inside wall 55 corresponds to and forms the third ridge line 33b or 43b of the drill section 3.

A V-shape flute line 59a between the flat inclined tapering bottom 54 and the first flat inclined tapering inside wall 58 corresponds to and forms the first inclined top line 39a or 49a of the drill section 3.

A V-shape flute line 59b between the flat inclined tapering bottom 54 and the second flat inclined inside wall 55 corresponds to and forms the second inclined top line 39b or 49b of the drill section 3 shown in the drawings.

The above-stated tip angle $\alpha$ is preferably formed to be about 90 degrees to 120 degrees. Particularly, the angle of about 110 degrees is preferable.

Accordingly, when the drilling screw of the present invention is manufactured, a pair of dies 21 is used to form the drill section, and the threaded convolutions are formed in a conventional manner by a pair of flat dies.

For the test of drilling efficiency, that is, for three different types of screws, a steel plate workpiece 5 is supported on a table 9 and is 1.2 mm in thickness. The screw is rotated by an electric driver 6 at 2,500 rpm and is applied to the workpiece with a force of 11 kg. The torque is recorded on a fast cathode-ray tube type oscillograph 8 at predetermined times through a distortion gauge and a distortion amplifier 10 for the torque on the workpiece 5.

In FIG. 10 for the drilling screw made with the dies of the present invention, from the start shown by a numeral 10-1 to the completion of fastening shown by a numeral 10-4, it takes a much shorter time than other conventional screws such as the tapping screw or the drilling screw having the chisel point.

In FIG. 8, respectively, the numeral 8-1 shows start, the numeral 8-2 shows time for piercing of the screw edge, the numeral 8-3 shows resistance of the threaded convolutions, the numeral 8-4 shows termination of drilling, and the numeral 8-5 shows torque by piercing of the screw.

In FIG. 9, respectively, the numeral 9-1 shows start, the numeral 9-2 shows time for drilling, the numeral 9-3 shows termination of drilling, and the numeral 9-4 shows torque produced by the drilling.

In FIG. 10, respectively, the numeral 10-1 shows start, the numeral 10-2 shows time for drilling, the numeral 10-3 shows termination of drilling, and the numeral 10-4 shows torque produced by piercing of the screw.

Turning to FIG. 8, it takes a relatively long time from start 8-1 to time for piercing of the screw edge and the plate must pass the long tapered portion of the tapping screw from the numeral 8-2 to the numeral 8-5, and further, it takes a relatively long time for drilling caused by resistance of the threaded convolutions at the numeral 8-3.

Turning to FIG. 9, also it takes a relatively long time from start to completion, mainly due to the time for the tip point to pass through the workpiece.

Turning to FIG. 10, the drilling screw made by the dies of this invention is able to thrust smoothly after start at the numeral 10-1 and it starts drilling shortly after thrust. This fact means that the required drilling time is reduced and the place for drilling is correctly determined, and further no vibration occurs.

At this point, the tapping screw is able to thrust into the workpiece in the same manner as the screws made by dies of the present invention, but start of drilling is delayed, and therefore, drilling efficiency is greatly reduced. Accordingly, the tapping screw is applied to only thin workpieces.

The conventional drilling screw requirs large torque immediately after start, as shown by the numeral 9-1, and therefore the tip of the screw slides from the predetermined place for drilling. However, the conventional drilling screw obtains stable drilling, since there is not much alteration of the torque during the drilling operation as compared with screws made by dies of the present invention. This excellent efficiency is based on removing ability of the scraps of the workpieces in accordance with forming of the edges to include curved edges and the large cutting flutes provided on the drill section. Therefore, the conventional drilling screw shown in FIG. 9 is particularly applied to thick workpieces having more than 2 mm in thickness to obtain excellent drilling efficiency.

As above described, the drilling screw manufactured by the dies of the present invention is comprised of all flat faces, not including curved faces and curved lines, differing from the conventional curved drill section. Therefore, it is exceedingly easy to manufacture the drill screw and the necessary dies, which makes it suitable for mass production, and the drilling efficiency is increased by omission of any chisel point.

Further, in accordance with the V-shaped flutes, the tip of the drill section is reinforced by the protruding block comprising the relief face and the inclined faces including one of the walls of the V-shaped flute.

Thus, the present invention is able to obtain excellent drilling efficiency with workpieces of 1 mm to 2 mm in thickness, and the inclined edges at the tip portion improve the thrust operation without any unsteadiness on the workpieces.

The invention may be embodied in other specific forms without departing from its spirit or essential characteristics. The described embodiment is to be considered in all respects only as illustrative and not limiting and the scope of the invention is, therefore, indicated by the appended claims rather than by the foregoing description. All changes which come within the meaning and range of equivalency of the claims are considered within their scope. Consequently, it is recognized that many variations may be made without departing from the scope or spirit of the present invention.

What is claimed is:

1. Dies for manufacturing a drill section of a drilling screw utilizing a pair of dies, each die comprising:
   a block member having a top, a bottom and sides;
   a cavity adjacent to one side of the block and having openings in the top and said one side of said block, said cavity comprising a flat inclined tapering bottom, a first flat inclined tapering inside wall, a second flat inclined inside wall, and a third flat inclined front inner wall;
   a first top flat elongate face provided adjacent to an upper edge of the first inclined tapering inside wall;
   a first longitudinal straight side edge adjacent to said second flat inclined inside wall;
   a second longitudinal straight side edge adjacent to said first top flat elongate face and parallel to said first side edge;
   a first straight oblique inclined front edge adjacent to said third inclined front inner wall;
   a second straight oblique inclined front edge adjacent to said first top flat elongate face and said second side edge and joining with said first front oblique edge at a front point;
   two side inclined faces being respectively adjacent to said first and second parallel side edges;
   two front inclined faces respectively adjacent to said first and second front oblique edges; and
   a second top flat face adjacent to a concavity formed by said two front inclined faces and an adjacent face and lying in the same plane as said first top flat elongate face, said two longitudinal side edges and said two front oblique edges.

2. Dies as claimed in claim 1 wherein said two front oblique edges meet at a front center portion of said block at a front end point of said first top flat elongate face.

3. A method of manufacturing a drilling screw comprising the steps of:
   positioning one end of a stem of a screw member between a pair of dies claimed in claim 1;
   forging the end of the stem by pressing the dies together to form a drill section;
   removing flashing from said drill section formed at the front and two sides of the dies; and
   forming a thread on the stem to form the drilling screw.

4. A method of manufacturing a drilling screw as claimed in claim 3, and further comprising: forming a screw head on the other end of the stem.

5. Dies as claimed in claim 1 wherein: said first longitudinal straight side edge and said first straight oblique inclined front edge of one die engage the first top flat elongate face on the inside of said second longitudinal straight side edge and said second straight oblique inclined front edge, respectively, of the other die when the dies are engaged.

* * * * *